Nov. 14, 1950   R. G. CRAMER   2,529,918
RING ROLL BEARING
Filed April 18, 1949   5 Sheets-Sheet 1

Inventor
Royal G. Cramer
By Clarence A. O'Brien
and Harvey B. Jacobson
Attorneys Nov. 14, 1950  R. G. CRAMER  2,529,918
RING ROLL BEARING
Filed April 18, 1949  5 Sheets-Sheet 5
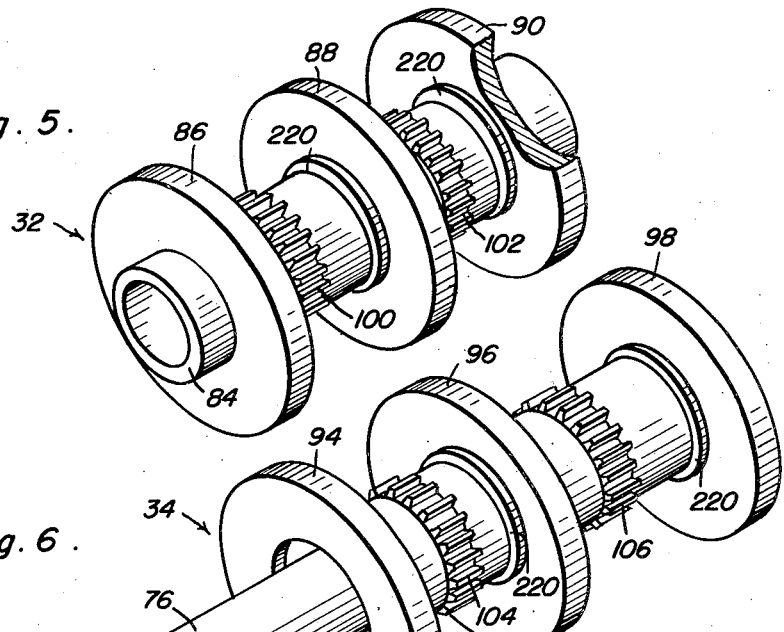
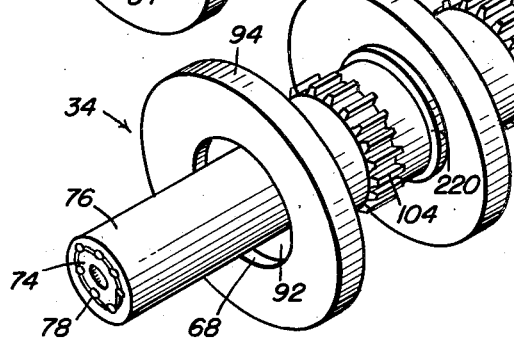
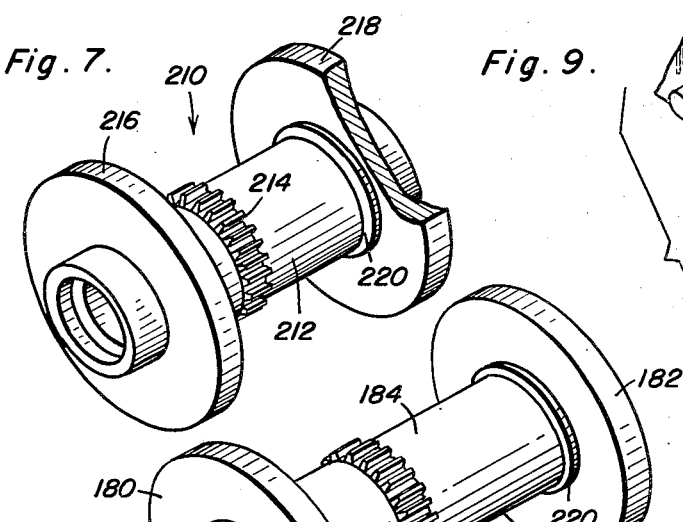
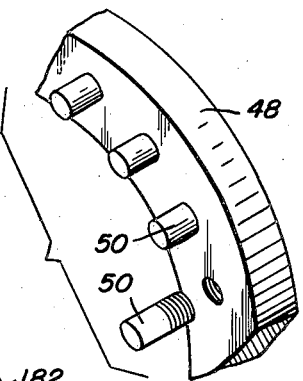
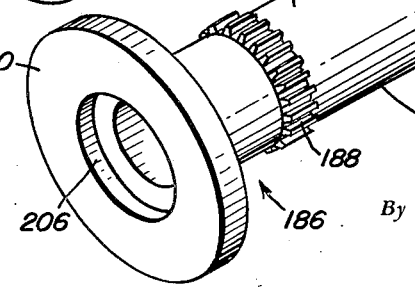
Inventor
Royal G. Cramer
By Clarence A. O'Brien
and Harvey B. Jacobson
Attorneys Patented Nov. 14, 1950

2,529,918

UNITED STATES PATENT OFFICE 2,529,918

RING ROLL BEARING

Royal G. Cramer, Zanesville, Ohio

Application April 18, 1949, Serial No. 88,179

11 Claims. (Cl. 308—205)

This invention comprises novel and useful improvements in a ring roll bearing, and in general pertains to an anti-friction roller bearing assembly adapted for carrying both rolling loads and thrusts, and equally applicable to the bearings of straight shafts as well as journalling members upon rotating crank throws of crank shafts.

The principal object of this invention is to provide an improved anti-friction roller bearing assembly capable of supporting extremely heavy loads and thrusts, of supporting loads at extremely high speeds, and for equalizing the distribution of the wear and loads upon the bearings for obtaining an improved efficiency of operation as well as a maximum life of the bearing assembly.

A very important object of the invention is to provide an anti-friction roller bearing assembly wherein the load supporting anti-friction rollers are assembled in a compact, novel and most efficient manner for evenly distributing the load carried by the anti-friction rollers throughout the bearing assembly.

A further object of the invention is to provide a bearing assembly wherein the load is equally distributed over a great number of anti-friction rollers, and wherein the latter are positively rotated to prevent localized wear as well as the formation of undue wear by uneven distribution of the load on parts of the assembly.

A further important object of the invention is to provide an anti-friction roller bearing assembly wherein the load supporting rollers are assembled in a most compact and efficient manner for satisfactorily supporting the loads and thrusts imparted thereto, and for handling loads at very great speeds of rotation.

These, together with various ancillary features and objects of the invention, which will later become apparent as the following description proceeds, are attained by this invention, preferred embodiments of which have been illustrated by way of example only in the accompanying drawings, wherein:

Figure 5 and Figure 6 are perspective views of the two different types of bearing rolls forming a part of the embodiment of Figures 1 and 2;

Figures 7 and 8 are perspective views of two bearing rolls forming elements of the embodiment of Figures 3 and 4;

Figure 9 is a fragmentary perspective view of a portion of the retaining means for the anti-friction roller assembly, one of the roller retaining pintles being shown in detached position from its carrier; and Figure 10 is a fragmentary sectional detail view taken substantially upon the plane of the section line 10—10 of Figure 4 and illustrating other structural features of the invention.

Figure 1:
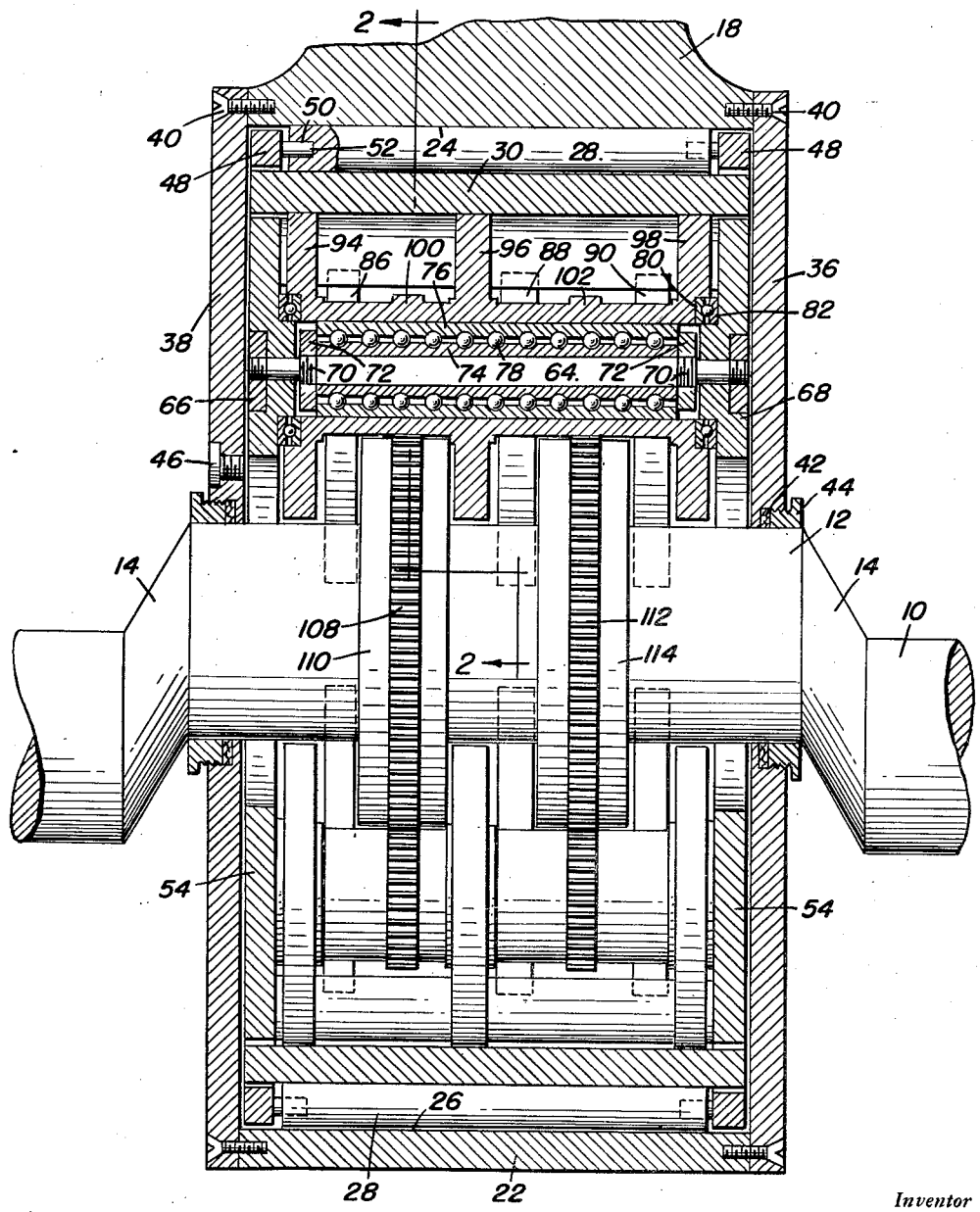
Figure 1 is a vertical longitudinal sectional view through one embodiment of bearing assembly, the latter being specifically adapted for use upon the crank throw of a crank shaft, as for journaling connecting rods thereon.

Referring now more specifically to the accompanying drawings wherein like numerals designate similar parts throughout the various views, attention is directed first to the embodiment of Figures 1, 2, 5, 6, which illustrates the bearing assembly in accordance with the principles of this invention which is particularly adapted for use upon the crank throw of crank shafts.

Indicated at 10 is a portion of any suitable crank shaft of any desired machine or assembly, which is provided with a crank throw 12 connected thereto as by crank cheeks 14. Any desired member such as a connecting rod or pitman 16 is adapted to be journaled upon the crank throw 12 through the bearing assembly illustrated in this embodiment. This pitman or connecting rod may conveniently comprise a connecting rod bearing block 18 secured detachably as by fastening bolts 20 to a connecting rod bearing cap 22, this connecting rod bearing and cap having complementary inner bearing surfaces 24 and 26 constituting the outside races for sealing a plurality of anti-friction rollers 28 which, in turn, are engaged by a rotating inner race 30, the latter being mounted upon two sets of bearing rolls 32 and 34, respectively, see Figures 5 and 6, which are positively rotated during rotation of the crank shaft 10 for supporting the movable inner race 30 thereon.

The bearing assembly preferably includes a pair of end closure plates 36 and 38, which may be detachably secured as by fastening screws or bolts 40 to the side surfaces of the connecting rod bearing and cap 18 and 22.

Disposed centrally of the cover plates 36 and 38 are openings by means of which the same may be mounted endwise upon the crank shaft and the crank throw 12, these openings being provided with suitable packing and sealing members 42 retained as by packing glands 44 screw-threaded into the openings. By this means, the entire bearing assembly is encased in a housing, whereby the same is protected against the entrance of dust or other foreign matter, and which may be supplied by oil sealed therein, through an opening closed by a closure plug 46. Thus, all of the moving parts of the bearing assembly are encased in a housing containing its own lubricant.

As above mentioned, the inner semi-cylindrical surface of the bearing 18 and bearing cap 22 constitutes the complementary sections of the cylindrical outer race which is journaled upon the roller bearing assembly to be now described. A pair of annular rings 48, see also Figures 9 and 10, have a series of circumferentially spaced, parallel screw-threaded pintles 50 which constitute stub axles upon which are rotatably journaled bearing recesses or bores 52 formed in the end of the rollers 28. Thus, the annular rings 48 constitute cages for journaling and positioning and relatively spacing the anti-friction rollers 28 circumferentially of the facing bearing surfaces 24 and 26 of the connecting rod bearing and the rotating inner bearing race 30.

Disposed radially inwardly of the inner race 30 are a second pair of annular members or rings 54 which, upon their outer sides, as shown in Figure 10, are provided with recesses 56 for the reception of fastening nuts 58 which engage the screw threaded extremities of tie rod bolts 60 extending through transversely disposed spacer members 62 which serve to separate and properly space the two rings 54, and in conjunction with the tie rod bolts 60 form a rigid inner bearing assembly with the same.

At equal angular intervals, the rings 54 are provided with transversely extending rods or shafts 64, eight such shafts being illustrated in this embodiment, although it will be understood that any desired number of such shafts may be employed for purposes which will later be apparent.

Each of these shafts 64 is secured to the pair of bearing rings 54 by the engagement of fastening nuts 66 which are seated in lateral recesses or bores 68 in the outside surfaces of the rings 54, upon the screw-threaded extremities of the shafts. Between the rings 54, the shafts 64 are provided with screw-threaded portions 70 for the reception of locking nuts 72 by means of which inner and outer cylindrical bearing races 74 and 76, having pluralities of anti-friction ball bearings 78 therebetween, are retained upon the shafts. These bearing races and ball bearing assemblies serve to journal the hub portions of the previously mentioned bearing rolls 32 and 34, these bearing rolls having axially disposed recesses 80 in their outer surfaces for the reception of any suitable anti-friction thrust bearing assembly, indicated at 82, these bearing assemblies serving to impart lateral thrust from the bearing rings 54 to the bearing rolls 32 and 34, as will be apparent from Figure 1.

As will now be seen from a consideration of Figures 1, 2, 5 and 6, the bearing rolls 32 and 34 are of two different constructions, a set of each type being employed in a compact nested arrangement.

Each of the rolls 32 includes a hub 84 which receives the outer race 76 of the bearing roll anti-friction bearing assembly. Upon the hub 84 are integrally or rigidly attached a plurality, such as three spaced bearing disks 86, 88 and 90, while, as shown in Figure 6, the bearing roll 34 has a similar hub 92 with three bearing disks 94, 96 and 98 likewise integrally or rigidly attached thereto. These disks of the two sets of bearing rolls revolvably support the sleeve member 30 comprising the inner race.

As will be seen particularly by reference to Figure 1, the relative spacing of the disks upon the hubs 84 and 92 is such that the disks 86 and 88 are respectively received on the right sides of the disks 94 and 96, while the disk 90 is received on the left side of the disk 88. Thus, the bearing roll 32 is received within the end disks 94 and 98 of the bearing roll 34 so that the three disks of the two sets of rolls are staggered with respect to each other to make a more compact arrangement.

Integrally or otherwise rigidly carried by the hub 84 are a pair of gears 100 and 102 disposed respectively between the disks 86 and 88, and 88 and 90, while the bearing roll 34 is likewise provided with gears 104 and 106 disposed between the disks 94 and 96, and the disks 96 and 98. The gears 100, 104 are disposed in the same plane, so that they all register with and are constantly engaged with corresponding gear teeth 108 which are recessed in the periphery of a radially enlarged collar 110 integrally or rigidly attached to the crank throw 12. Similarly, the gears 102 and 106 are constantly enmeshed with a similar gear 112 recessed into the circumference of the annularly enlarged collar 114.

It will now be seen that the annular collars 110 and 114 are received between the sets of bearing roll disks 86 and 96 of the bearing rolls 32 and 34, respectively, and the disks 88 and 90 of the bearing roll 32. These collars thus serve, to some extent, to guide into position the sets of bearing rolls, as well as to provide a geared connection thereto.

It will now be seen that as the crank shaft 10 is rotated, the gears 108 and 112 carried by the crank throw 12 thereof will continuously cause rotation of the two sets 32 and 34 of bearing rolls which, in turn, will rotatably journal the inner race 30 of the roller bearing assembly rolls 28, which latter, in turn, revolvably supports the connecting rod bearing and cap 18 and 22. It will thus be seen that the rotation of the crank shaft throw within the bearing assembly, as well as the oscillation of the connecting rod thereon will both be supported by surfaces which are free to revolve, thus enabling the thrust to be evenly distributed over the surfaces, as well as to prevent the thrust from causing wear in any one place therein.

Figure 2:
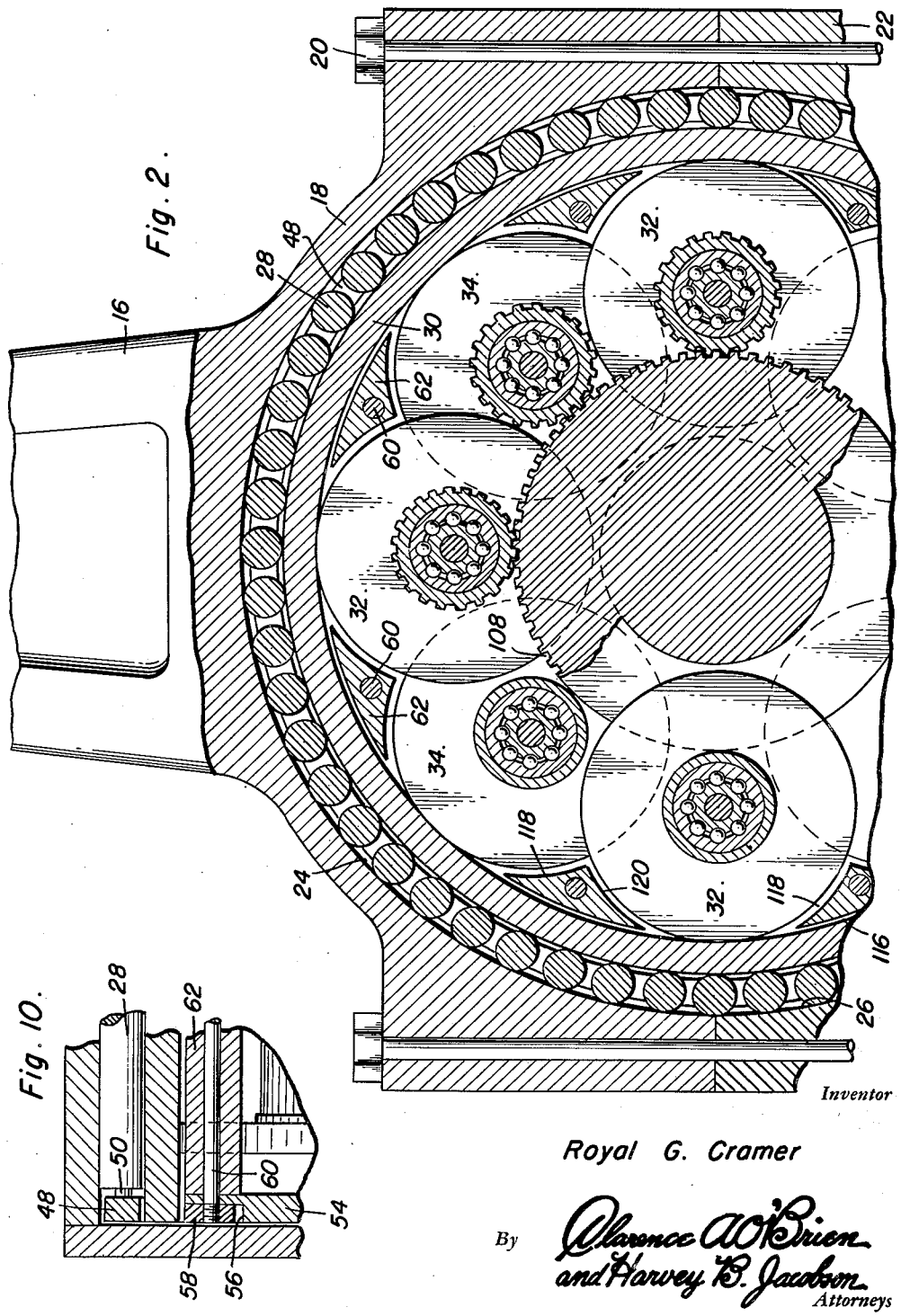
Figure 2 is a fragmentary vertical transverse sectional view taken substantially upon the plane of the section line 2—2 of Figure 1 and illustrating further details of construction of this embodiment.

It may be here noted that the spacer members 62, shown in Figures 2 and 10, are preferably provided with arcuate outer surfaces 116, constituting convex cylindrical surfaces, and with intersecting arcuate surfaces 118 and 120 constituting concave cylindrical surfaces. These three arcuate surfaces are closely spaced to the inner surface of the bearing member 30, and to the adjacent peripheries of the disks of the two bearing roll assemblies 32 and 34. The close spacing of the surfaces 118 and 120 has the important function that they constitute a guide means for holding the lubricant closely adjacent the roll bearings so as to insure effective and ample lubrication of the same during their rolling support of the bearing member 30.

Figure 3:
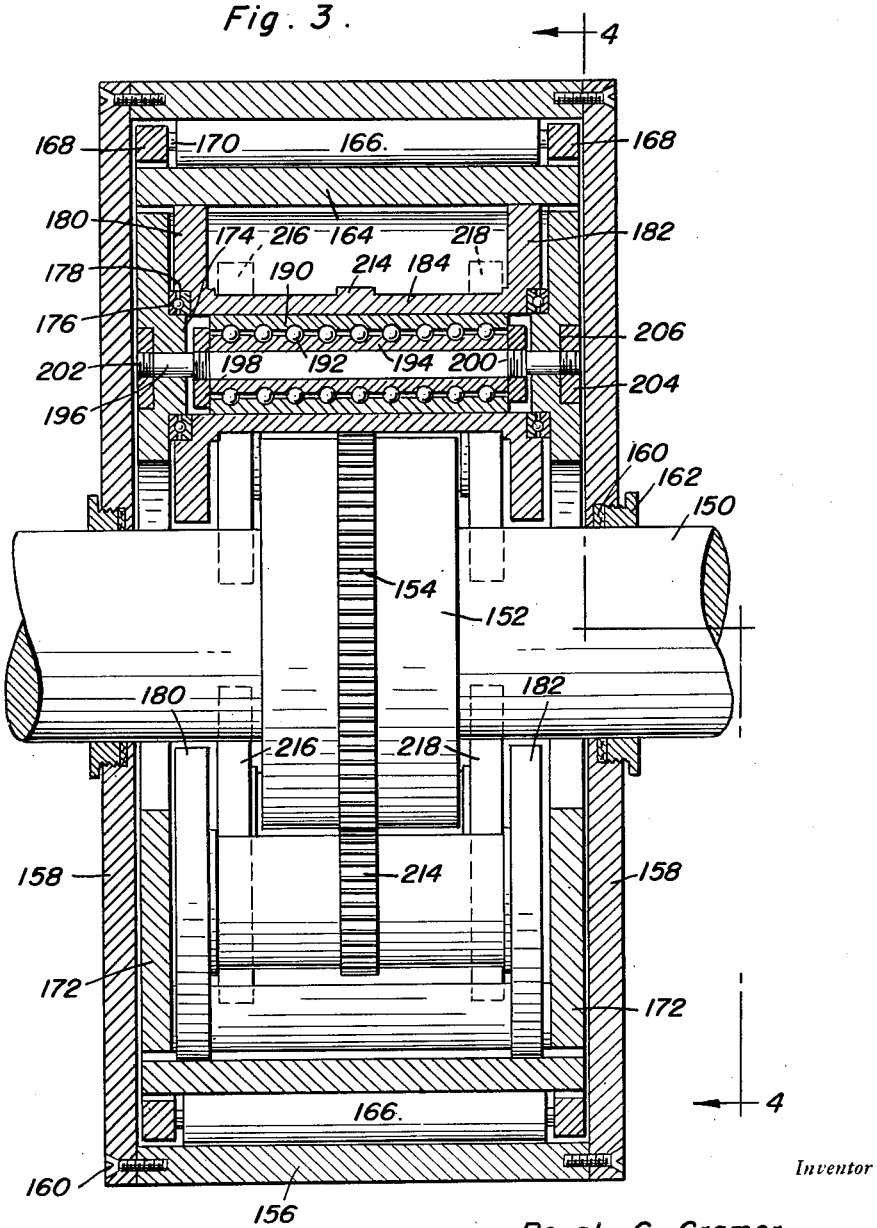
Figure 3 is a vertical central longitudinal sectional view through another embodiment of the invention which is particularly adapted for use as a bearing for straight shafts.
Figure 4:
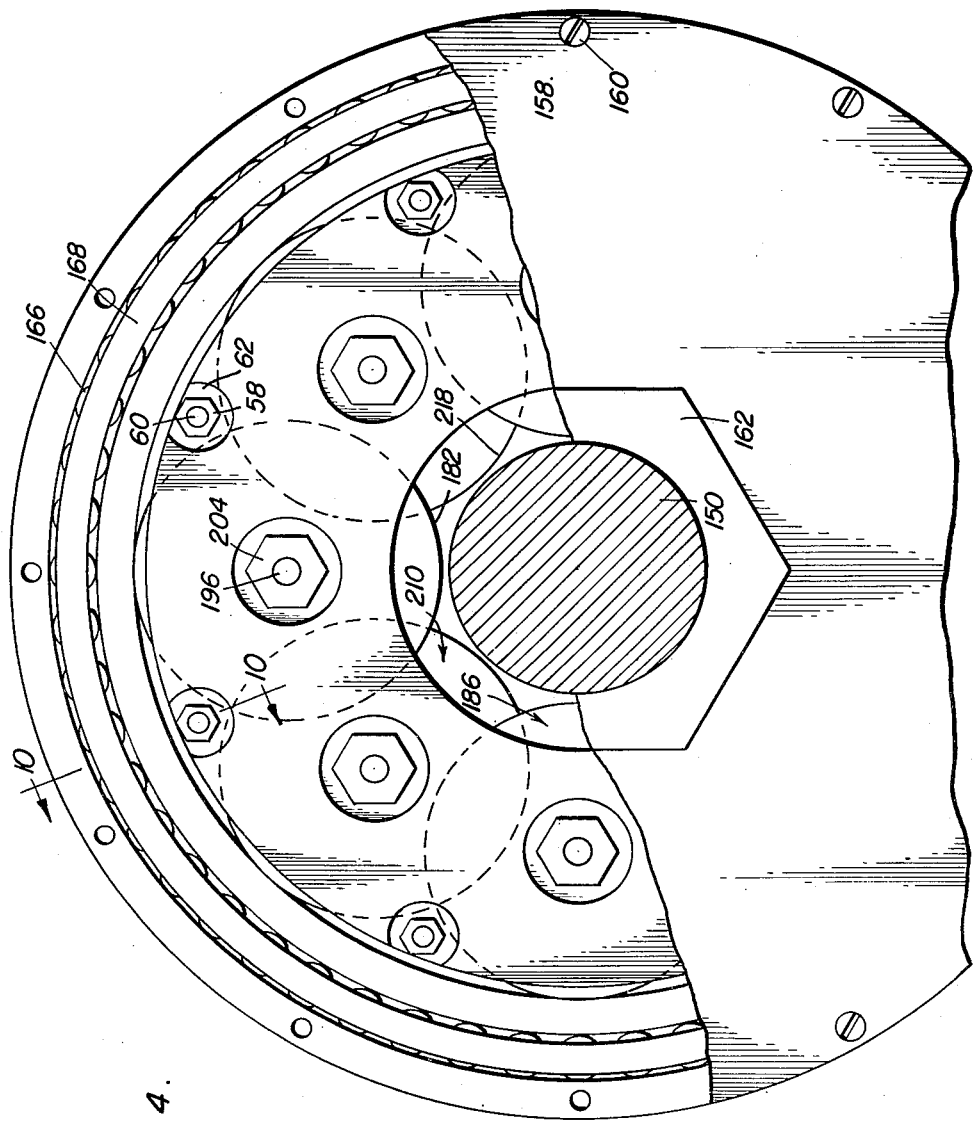
Figure 4 is a horizontal sectional view taken substantially upon the plane of the section line 4—4 of Figure 3, showing part of the assembly in elevation and part in section immediately beneath the cover plate thereof.

Reference is now made to the embodiment of Figures 3 and 4 in conjunction with the bearing rolls of Figures 7 and 8, and with the detail views of Figures 9 and 10 which are equally applicable to both embodiments.

In this modification of the principles of the invention, a straight shaft 150 is provided with an annular enlargement 152 having a recessed ring gear 154 therein. An annular, drum-like bearing casing 156 surrounds this shaft, and has secured thereto detachable end or cover plates 158, removably secured as by fastening screws 160. These plates, as in the preceding embodiment, are also provided with centrally disposed apertures for receiving the shaft 150, and are provided with suitable packing or sealing means 160 retained as by packing glands 162 screw-threaded into these apertures. In this construction, also, the interior of the casing 156 constitutes a lubricant-receiving chamber whereby the working parts of the bearing assembly are lubricated at all times, and whereby the bearing assembly and its lubricant are sealed against the entrance of dirt or other foreign matter.

Also as in the preceding embodiment, the bearing assembly includes a floating bearing ring 164, corresponding to the bearing member 30, which serves as the inner race for an assembly of anti-friction roller bearings 166, and serves as the outer race for a series of bearing rolls, as set forth hereinafter.

This anti-friction roller bearing assembly likewise includes a pair of spaced rings 168 having screw-threaded, parallel, inwardly extending pintles 170 about which are journaled the above mentioned rolls 166, all as in the preceding embodiment.

Likewise as in the preceding embodiment, there is provided what may be termed an inner bearing assembly consisting of a pair of spaced rings 172, provided on their adjacent surfaces with circumferentially spaced annular shoulders or projections 174, upon which are mounted suitable anti-friction bearing assemblies 176 which are seated in bearing recesses 178 in the outside surfaces of bearing roll disks 180 and 182 formed at the extremities of a sleeve hub portion 184 of what may be termed outer roll bearing assemblies, designated generally by the numeral 186 and illustrated in Figure 8.

Integrally or otherwise rigidly formed on the sleeve or hub 184 is a gear 188 adapted to be continuously in mesh with the gear 154. The sleeve 184 is likewise rotatably received upon the outer race 190 which is anti-frictionally journaled, as by ball bearing assemblies 192, upon the inner race 194 which is received upon a shaft 196, being retained thereon as by lock nuts 198 engaging screw-threaded portions 200 of this shaft.

The series of shafts are circumferentially spaced and secured to the two bearing rings 172, and for that purpose are provided at their extremities with screw-threaded portions 202 to which are secured fastening nuts 204 received in annular recesses 206 formed in the outer surface of the disks 180 and 182.

The mounting of these bearing rolls is thus, in every respect, identical with that of the preceding embodiment, the roll structure itself being different in that the disks and the gear members are differently spaced and thus are assembled in a different relation from that of the preceding embodiment.

Likewise in conformity with the preceding embodiment, the bearing rings 172 are rigidly secured together in spaced relation by the spacer and tie bolt assembly disclosed in Figure 10 and described with respect to the preceding embodiment.

The second set of bearing rolls forming a part of this embodiment is indicated generally by the numeral 210 and is illustrated in Figure 7, and likewise comprises a sleeve or hub portion 212 to which is integrally or rigidly attached a circumferential gear 214 likewise continuously enmeshed with the above described gear 154. Spaced from the extremities of the sleeve or hub portion 212 are a pair of bearing roll disks 216 and 218 which are adapted to be received within the disks 180 and 182 of the bearing roll of the other set.

To assist in properly spacing the corresponding disks of the two sets of bearing rolls, the sleeves or hubs of each of the bearing rolls of both sets of both embodiments are provided with suitable annular shoulders indicated at 220 in each of Figures 5–8.

The operation of this embodiment is identical with that of the first embodiment described, the relative rotation of the shaft and the bearing assembly causing a rotation of the bearing rolls, which in turn rotatably support the floating bearing race, the latter journaling by the anti-friction rollers of the outer casing of the bearing assembly.

From the foregoing, the construction and operation of the device will be readily understood, and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A bearing assembly comprising a shaft having a gear thereon, a plurality of bearing rolls surrounding said shaft, each of said bearing rolls having a gear meshing with said shaft gear, a bearing sleeve rotatably supported upon said shaft by said bearing rolls, an outer bearing member surrounding said bearing sleeve, a plurality of anti-friction bearing elements interposed between said outer member and said bearing sleeve.

2. An anti-friction bearing assembly including a shaft, an outer bearing member and a sleeve surrounding said shaft, anti-friction bearing means journaling said outer bearing member on said sleeve, anti-friction members journaling said sleeve on said shaft, and gearing connecting each of said anti-friction members to said shaft for causing positive rotation of the former upon rotation of the latter.

3. The combination of claim 1 wherein said bearing rolls comprise sleeves having spaced bearing disks thereon, said disks supporting said bearing sleeve.

4. The combination of claim 2 wherein said anti-friction members comprise sets of circumferentially spaced bearing rolls, the corresponding rolls of different sets being circumferentially staggered about said shaft.

5. The combination of claim 4 wherein each bearing roll includes a hub portion and a plurality of spaced bearing disks thereon, said disks directly supporting said sleeve.

6. The combination of claim 5 wherein the bearing disks of the rolls of different sets are differently spaced upon their hubs whereby adjacent rolls of different sets may be nested together.

7. The combination of claim 1 wherein said bearing rolls comprise sleeves having spaced bearing disks thereon, said disks supporting said bearing sleeve, said shaft having a collar thereon, said disks straddling said collar.

8. The combination of claim 1 wherein said bearing rolls comprise sleeves having spaced bearing disks thereon, said disks supporting said bearing sleeve, said shaft having a collar thereon, said disks straddling said collar, said bearing being recessed into the periphery of said collar and the bearing roll sleeves being journaled on the periphery of said collar.

9. The combination of claim 2 including bearing rings, said anti-friction members being journaled between said rings, and plates carried by said outer bearing member for enclosing said sleeve, anti-friction bearing means and said anti-friction members.

10. The combination of claim 2 including bearing rings, said anti-friction members being journaled between said rings, and plates carried by said outer bearing member for enclosing said sleeve, anti-friction bearing means and said anti-friction members, axles fixed between said bearing rings, bearing assemblies on said axles, said anti-friction members being journaled on said bearing assemblies.

11. The combination of claim 2 including bearing rings, said anti-friction members being journaled between said rings, and plates carried by said outer bearing members for enclosing said sleeve, anti-friction bearing means and said anti-friction members, axles fixed between said bearing rings, bearing assemblies on said axles, said anti-friction members being journaled on said bearing assemblies, inwardly extending shoulders on said bearing rings, shouldered recesses in said anti-friction members, thrust bearings seated on said shoulders and in said shouldered recesses.

ROYAL G. CRAMER.

REFERENCES CITED

The following references are of record in the file of this patent:

UNITED STATES PATENTS

| Number | Name | Date |
|---|---|---|
| 1,748,174 | Hirvonen | Feb. 25, 1930 |
| 1,798,529 | Foley | Mar. 31, 1931 |